(No Model.) 2 Sheets—Sheet 1.

J. J. PRENDERGAST.
EXCAVATOR.

No. 563,941. Patented July 14, 1896.

Witnesses
W. A. Alexander
E. E. Vernell

Inventor
J. J. Prendergast
By Attorneys
Fowler & Fowler

THE NORRIS PETERS CO., PHOTO-LITHO., WASHINGTON, D. C.

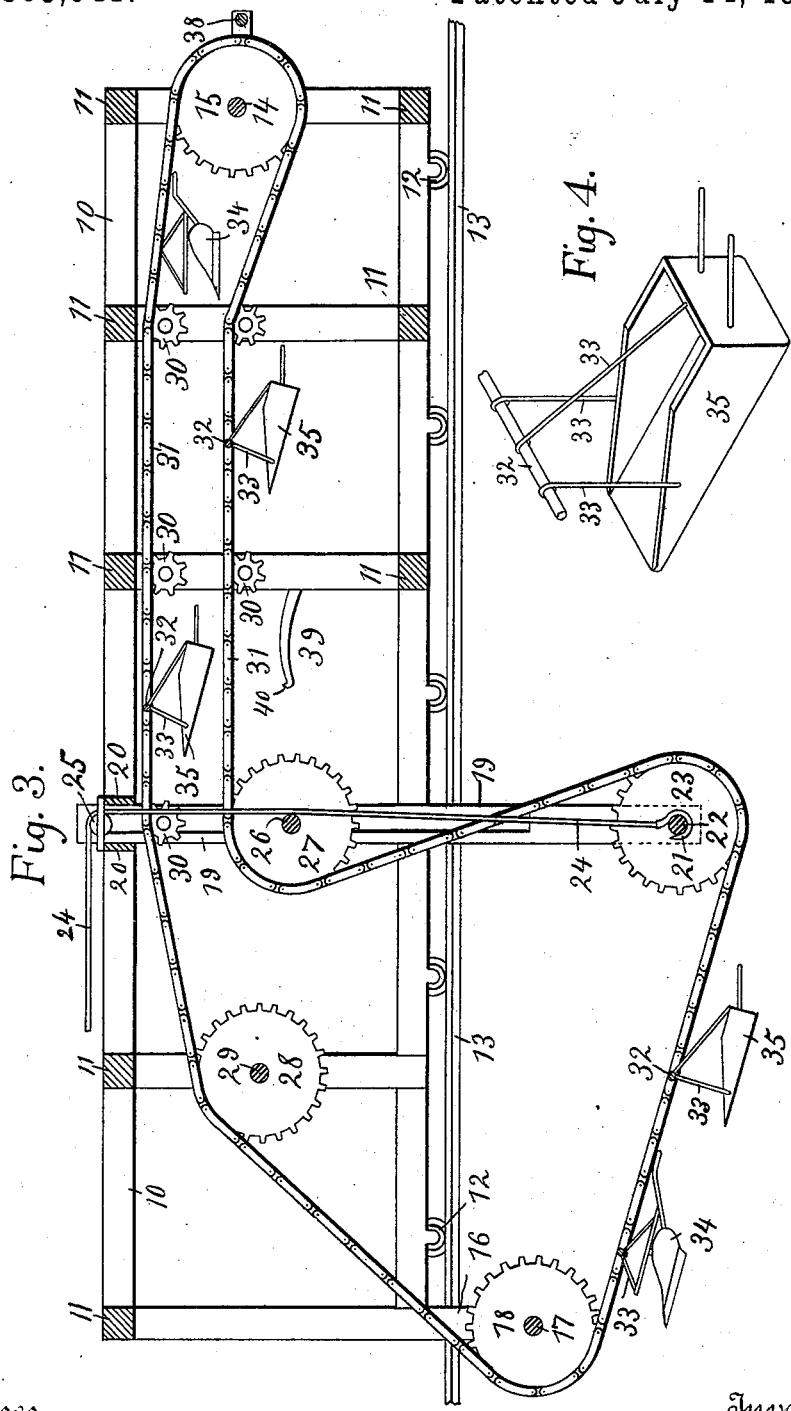

UNITED STATES PATENT OFFICE.

JEFFREY J. PRENDERGAST, OF ST. LOUIS, MISSOURI.

EXCAVATOR.

SPECIFICATION forming part of Letters Patent No. 563,941, dated July 14, 1896.

Application filed September 12, 1895. Serial No. 562,332. (No model.)

*To all whom it may concern:*

Be it known that I, JEFFREY J. PRENDERGAST, a citizen of the United States, residing at the city of St. Louis, in the State of Missouri, have invented a certain new and useful Excavator, of which the following is such a full, clear, and exact description as will enable any one skilled in the art to which it appertains to make and use the same, reference being had to the accompanying drawings, forming part of this specification.

My invention relates to a new and useful excavator, and more particularly to one for digging trenches for sewers and similar purposes.

The object of my invention is to construct an apparatus for digging trenches and for similar purposes, which will remove the earth without shoveling, spading, or similar manual labor and convey it to a suitable place for refilling the trench or carting away, as is required.

My invention consists of various novel features and details of construction described in the following specification and pointed out in the claim affixed hereto.

Figure 1:
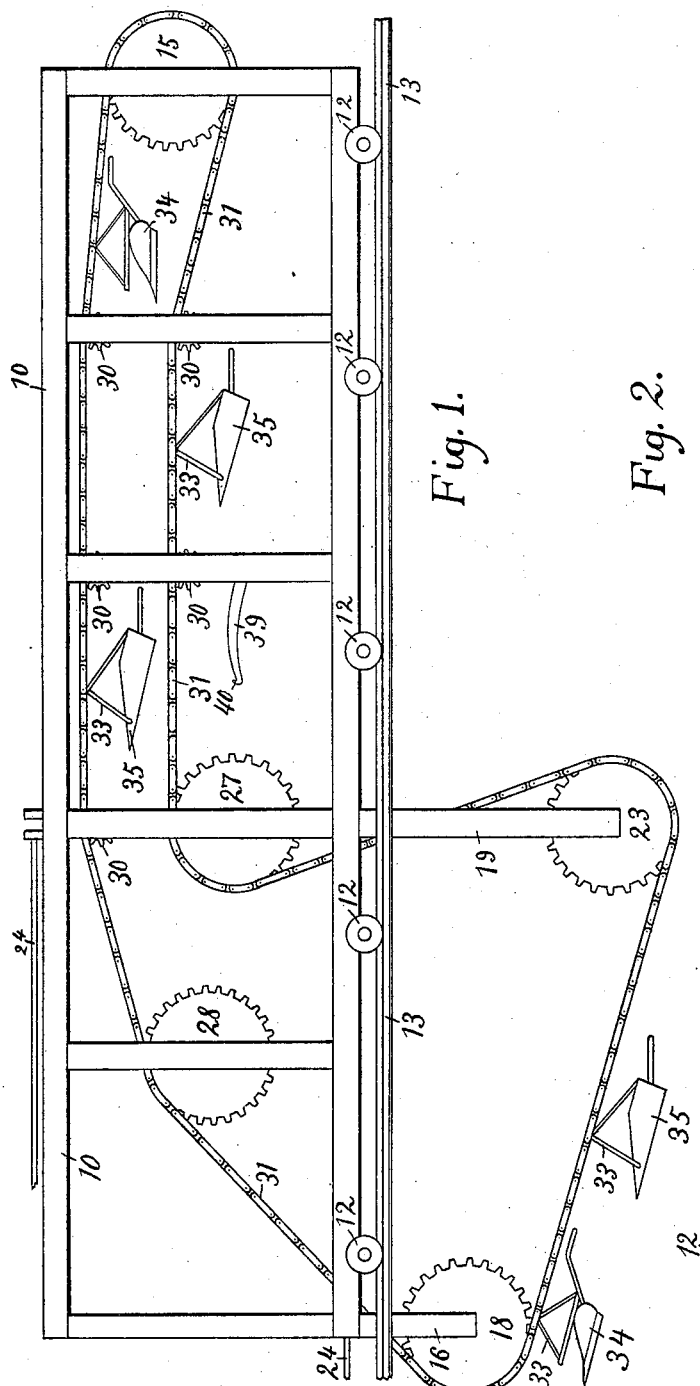
Figure 2:
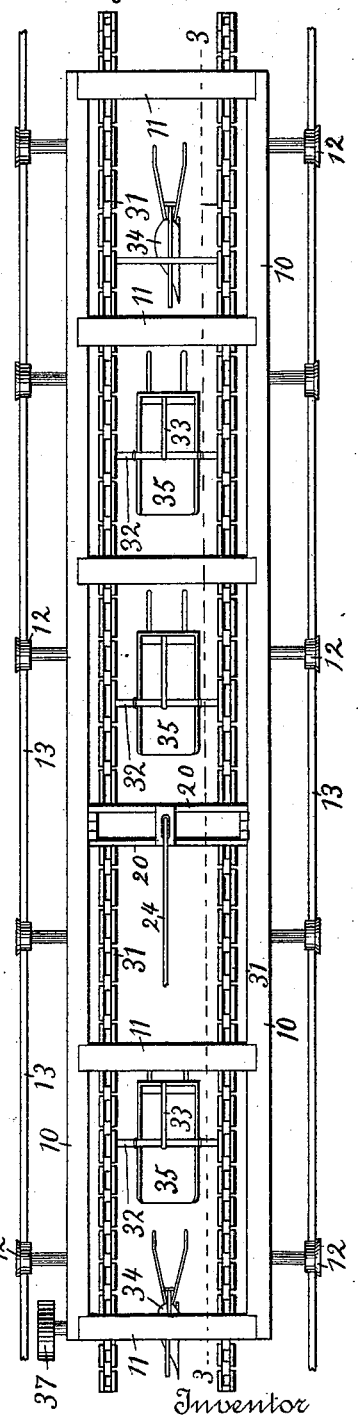

In the accompanying drawings, which illustrate an apparatus embodying one form of my invention, Figure 1 is a side elevation; Fig. 2, a top view; Fig. 3, a section on the line 3 3 of Fig. 2, and Fig. 4 an isometric projection of one of the scrapers.

Like marks of reference refer to similar parts in the several views of the drawings.

10 are two side frames which are connected by cross-pieces 11. The side frames 10 are provided with wheels 12, which run on a suitable track 13. In the side frames 10, at one end of the machine, is journaled a shaft 14, Fig. 3, on which are mounted two sprocket-wheels 15. At the opposite end of the machine two pieces 16 extend a short distance below the side frames 10, and in them is journaled a shaft 17, on which are mounted two sprocket-wheels 18. At a suitable distance from the pieces 16 are two uprights 19, which extend a considerable distance below the side frames 10. In the uprights 19, Fig. 3, is journaled a shaft 22, on which are mounted two sprocket-wheels 23. The uprights 19 pass between two bars 20, secured to the side frames 10. On the bars 20 is mounted a pulley 25, over which passes a rope 24, provided with a hook 21 for engaging with the shaft 22 when it is desired to raise the wheels 23. The uprights are slotted, so as not to interfere with the shaft 26 and the studs on which the sprocket-wheels 30 are mounted. The rope 24 is carried to a suitable drum or other device for raising or lowering the sprocket-wheels 23. Journaled in the side frames 10, above the sprocket-wheels 23, is a shaft 26, on which are mounted two sprocket-wheels 27. Between the wheels 27 and the end of the machine at which the wheels 18 are mounted are two sprocket-wheels 28, mounted on a shaft 29, journaled in the side frames 10.

Passing around the wheels 15 18 23 27 28 and sprocket-wheels 30, mounted on studs secured to the side frames 10, are two sprocket-chains 31. The sprocket-chains 31 are connected at suitable intervals by bars 32, from which are suspended by suitable chains or ropes 33 (preferably chains) plows 34 and scrapers 35, both provided with suitable handles for guiding the same. The sprocket-wheels 15, 18, 23, 27, and 28, being provided with axles extending across the machine, must be large enough to leave sufficient space between the chains and the axles for the passage of the plows and scrapers, while the wheels 30, being mounted on studs, may be of any convenient size. Mounted on the shaft 17 of the sprocket-wheels 18 is a belt, sprocket, or other wheel 37, Fig. 2, to which the power is applied.

38, Fig. 3, is a bar carried by suitable brackets secured to the side frames 10 for dumping the scrapers.

39 is a curved plate secured to the side frame 10. It is provided with an upward projection 40. When one of the scrapers strikes the plate 39, it is tipped until its front edge catches on the projection 40, which causes it to be overturned and discharged.

The operation of my machine is as follows: The sprocket-wheels 23 are placed in such a position that the plows 34 and scrapers 35 will make working contact with the ground as they reach the lowest point. The earth, loosened by the plows, is collected by the scrapers and carried around the wheel 18 and then back to the rear of the machine, where it is dumped. The plows and scrapers are guided by hand, the flexible connections allowing them to be moved laterally and raised from or lowered into the earth at will. In this way the earth is removed more rapidly and thoroughly than can be done by scoops and cutters rigidly connected to the chain and automatically operating to loosen and remove the earth, and obstructions of any kind in the earth can be avoided which would result in the breaking of scoops and cutters attached rigidly to the chains. If it is desired to dump the earth at the extreme end of the machine, the bars 38 can be secured in place. The handles of the scrapers will strike the bars as they descend around the wheels 15, and thus be dumped. If it is desired to dump the scraper at any other point, it can be done by hand or by the plate 39. The sprocket-wheels 23 at the start are gradually lowered as the earth is removed until the desired depth is reached. The wheels 23 are then raised some distance, the machine moved forward on the track 13, and the operation repeated, the wheels 23 being lowered to their former depth.

I am aware that conveyers have been used to remove earth after it has been shoveled into suitable receptacles, and also that endless chains have been provided with scoops or buckets and cutters attached rigidly thereto. Therefore I disclaim such devices.

Having fully described my invention, what I claim as new, and desire to secure by Letters Patent of the United States, is—

In an excavator, a suitable frame, sprocket-wheels carried by said frame, sprocket-chains traveling on said sprocket-wheels and forming an endless conveyer, part of said endless conveyer being inclined, means for varying the inclination of said inclined portion, plows and scrapers provided with suitable handles, and flexible connections between said endless conveyer and plows and scrapers, whereby said plows and scrapers may be guided by hand in loosening and removing the earth.

In testimony whereof I have hereunto set my hand and affixed my seal in the presence of the two subscribing witnesses.

JEFFREY J. PRENDERGAST. [L. S.]

Witnesses:
A. C. FOWLER,
J. F. WESTON.